United States Patent [19]
Yamamoto et al.

[11] Patent Number: 5,741,861
[45] Date of Patent: Apr. 21, 1998

[54] RESIN COMPOSITION FOR LAMINATES

[75] Inventors: Koji Yamamoto; Hajime Ikeno; Keiko Shichijo, all of Yokkaichi, Japan

[73] Assignee: Mitsubishi Chemical Corporation, Tokyo, Japan

[21] Appl. No.: 409,957

[22] Filed: Mar. 23, 1995

Related U.S. Application Data

[63] Continuation of Ser. No. 153,966, Nov. 18, 1993, abandoned.

[30] Foreign Application Priority Data

| Dec. 3, 1992 | [JP] | Japan | 4-323529 |
| Dec. 25, 1992 | [JP] | Japan | 4-345750 |

[51] Int. Cl.⁶ .................................................. C08L 23/04
[52] U.S. Cl. ........................ 525/240; 525/53; 525/320; 525/324
[58] Field of Search ........................ 525/240, 53, 320, 525/324

[56] References Cited

U.S. PATENT DOCUMENTS

| 5,120,696 | 6/1992 | Tsutsui et al. | 526/116 |
| 5,189,106 | 2/1993 | Morimoto et al. | 525/240 |
| 5,206,075 | 4/1993 | Hodgson, Jr. | 525/240 |
| 5,260,384 | 11/1993 | Morimoto et al. | 525/240 |
| 5,378,764 | 1/1995 | Benham et al. | 525/240 |
| 5,382,631 | 1/1995 | Stehling | 525/240 |

*Primary Examiner*—Cecilia J. Tsang
*Assistant Examiner*—Patrick R. Delaney
*Attorney, Agent, or Firm*—Oblon, Spivak, McClelland, Maier & Neustadt, P.C.

[57] ABSTRACT

A resin composition containing 50 to 99% by weight of component A, which is a copolymer of ethylene and α-olefin, and 1 to 50% by weight of component B, which is a high-pressure low-density polyethylene. The component A has (a) a melt flow rate (MFR) of 2 to 30 g/10 min., (b) a density of not more than 0.935 g/cm³, and (c) a single peak of elution volume indicated by an elution curve obtained by temperature rising elution fractionation, the peak corresponding to a temperature within a range of from 20° C. to 85° C., and the elution curve satisfying a relationship in which the ratio H/W is not less than 1 when H represents the height of the peak and W represents the width of the elution curve at half of the height H. The component B has (a') a melt flow rate of 0.1 to 20 g/10 min., (b') a density of 0.915 to 0.93 g/cm³, ('c) a memory effect (ME) of not less than 1.6, and (d') a melt tension (MT) of not less than 1.5 g. The resin composition is advantageously usable as a laminate material having improved workability, and excellent properties with respect to low-temperature heat sealability, heat sealing strength and hot tack.

23 Claims, 1 Drawing Sheet

FIG. 1

RESIN COMPOSITION FOR LAMINATES

This application is a Continuation of application Ser. No. 08/153,966, filed on Nov. 18, 1993, now abandoned.

BACKGROUND OF THE INVENTION

1. Field of the Invention

The present invention relates to a resin composition for laminates that has improved workability, and far more superior low-temperature heat sealability, heat sealing strength and hot tack than conventional forming materials.

2. Description of the Related Art

A conventional material for laminates has been a high-pressure low-density polyethylene (hereinafter abbreviated as "LDPE") obtained by polymerizing ethylene at high temperatures under high pressures by using a free-radical. Although LDPE enables the formation of a stable film and has excellent high-speed workability, the substance has poor properties with respect to low-temperature heat sealability, heat sealing strength and hot tack.

In view of these problems, the conventional practice includes substituting an ethylene-vinyl acetate copolymer (EVA) or the like for LDPE. Although EVA has excellent low-temperature heat sealability, it cannot compensate for the other problems of LDPE, that is, poor heat sealing strength and poor hot tack. Furthermore, since EVA lacks thermal stability at or around 280° C., which is a normal forming temperature for laminating, the substance may decompose during laminating, and generate a particular odor.

Recently, another material known as a linear low-density polyethylene (hereinafter abbreviated as "LLDPE") has been developed. This substance is a copolymer of ethylene and α-olefin produced by a medium-pressure process, such as that disclosed, e.g., in Japanese Patent Publication No. 56-18132, by using a Ziegler catalyst. Although LLDPE has excellent properties with respect to heat sealing strength, hot tack, impact resistance, etc., and is thus capable of overcoming the problems of more conventional LDPE, the workability of LLDPE has serious problems. That is, LLDPE exhibits a higher shearing viscosity in an extruder than LDPE, thereby increasing resin pressure. As a result, it becomes difficult to perform high-speed working, or the extruder may require a greatly increased level of power. Another problem is that LLDPE has such a small melt tension that a formed film may have mottles in the thickness or width thereof, thereby failing to provide a practical product.

A technique for overcoming these problems has been proposed, e.g., in Japanese Patent Laid-Open No. 58-194935, in which LLDPE and LDPE are blended together.

However, a material obtained by such blending technique and improved so as to have satisfactory workability, tends to have insufficient properties with respect to low-temperature heat sealability, heat sealing strength, hot tack, etc. Therefore, the development of a material having good balance between these properties and workability has been desired.

More recently, Japanese Patent Laid-Open No. 58-19309, etc. discloses a novel catalyst, the use of which enables the production of a special kind of LLDPE having a narrower range of molecular-weight distribution and a more limited variation of chemical composition than conventional LLDPE. The present inventors have researched how to use this special LLDPE as a material for forming extruded laminates, finding that although the special LLDPE has greatly improved properties with respect to low-temperature heat sealability, heat sealing strength and hot tack over those of conventional LLDPE, the special LLDPE material has far poorer workability than conventional LLDPE, whose workability itself is unsatisfactory. Thus, this special LLDPE has been proved to be a material having poor balance between workability and certain other required properties.

SUMMARY OF THE INVENTION

An object of the present invention is to provide a resin composition for laminates that has excellent properties with respect to low-temperature heat sealability, heat sealing strength, hot tack, etc. not achieved by conventional materials, and that also has improved workability, the resin composition according to the present invention thus achieving excellent properties while still possessing improved workability.

In view of the above-described problems, the present inventors have made various studies, finding that the object of the present invention can be achieved if a specific LLDPE is selected, and is blended with a specific LDPE. The present invention has been formulated on the basis of this knowledge.

A resin composition for laminates according to the present invention is characterized in that the resin composition contains component A and component B specified as follows:

Component A:

Component A is a copolymer of ethylene and olefin having a carbon number of 3 to 18, the component A being contained in the resin composition in an amount of 50 to 99% by weight, and having the following properties (a) to (c):

(a) a melt flow rate (MFR) of 2 to 30 g/10 min.;

(b) a density of not more than 0.935 g/cm$^3$; and (c) an elution curve having a single peak of elution volume, as indicated by an elution curve obtained by temperature rising elution fractionation (TREF), the peak corresponding to a temperature within a range of from 20° to 85° C., and the elution curve satisfying a relationship in which the ratio H/W is not less than 1 when H represents the height of the peak and W represents the width of the elution curve at half of the height H, wherein the elution curve may also indicate substantial elution volume at temperatures other than the temperature to which the peak corresponds.

Ingredient B:

Ingredient B is a high-pressure low-density polyethylene, the component B being contained in the resin composition in an amount of 1 to 50% by weight, and having the following properties (a') to (d'):

(a') a melt flow rate of 0.1 to 20 g/10 min.;

(b') a density of 0.915 to 0.93 g/cm$^3$;

(c') a memory effect (ME) of not less than 1.6; and (d') a melt tension (MT) of not less than 1.5 g.

BRIEF DESCRIPTION OF THE DRAWING

The single drawing is a graph depicting an elution curve obtained by temperature rising elution fractionation, the elution curve showing the relationship between temperature and the elution volume of an ethylene-α-olefin copolymer contained in Example 18 of the present invention. In FIG. 1, (a) indicates a peak, and (b) and (c) indicate substantial elution volume at temperatures other than the temperature which said peak corresponds to.

DETAILED DESCRIPTION OF THE INVENTION

[I] Component (1) Component A (Ethylene-α-olefin Copolymer)

(a) Properties of Component A

It is important that an ethylene-α-olefin copolymer serving as component A contained in a resin composition for laminates according to the present invention have the following properties ① to ③, preferably ① to ⑤:

① Melt Flow Rate

The ethylene-α-olefin copolymer used in the present invention should have a melt flow rate (MFR) within a range of from 2 to 30 g/10 min. as measured in accordance with Japanese Industrial Standards (JIS) K7210, preferably from 5 to 25 g/10 min., more preferably from 10 to 22 g/10 min., and most preferably from 13 to 20 g/10 min.

If the melt flow rate of the copolymer exceeds the upper limit of the range from 2 to 30 g/10 min., film formation may be unstable. If that melt flow rate is less than the lower limit of this range, film breakage may occur during film formation.

② Density

The ethylene-α-olefin copolymer used in the present invention should have a density of not more than 0.935 g/cm³ as measured in accordance with JIS K7112, preferably within a range of from 0.87 to 0.92 g/cm³, more preferably within a range of from 0.88 to 0.913 g/cm³, most preferably within a range of from 0.89 to 0.91 g/cm³.

If the density of the copolymer exceeds 0.935 g/cm³, low-temperature heat sealability may be impaired. If the copolymer has too small a density, blocking may occur on the surface of a formed film, thereby rendering the film unusable. Normally, the lower limit of the density of the copolymer is approximately 0.86 g/cm³.

Figure 1:
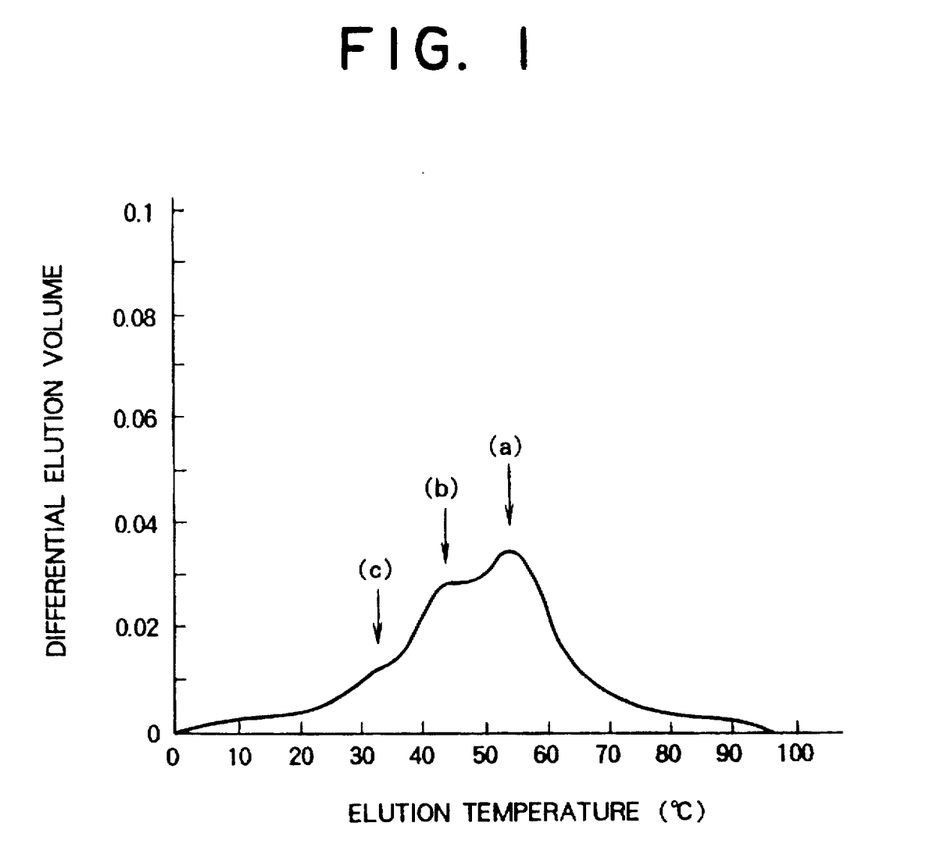

③ Temperature at the Peak of Elution Curve Obtained by Temperature Rising Elution Fractionation The ethylene-α-olefin copolymer used in the present invention should have an elution curve, obtained by temperature rising elution fractionation (TREF), which has a single peak. The peak should correspond to a temperature within a range of from 20° to 85° C., preferably from 30° to 75° C., and more preferably from 40° to 70° C. The elution curve should satisfy a relationship in which the ratio H/W of the height H of the peak with respect to the width W of the elution curve at half of the height H is not less than 1, preferably within a range of from 1 to 20, more preferably from 1 to 15, and most preferably from 1 to 10. The elution curve may indicate substantial elution volume (such as those indicated by (b) and (c) in FIG. 1) at temperatures other than the temperature to which the peak corresponds.

If the peak of the elution curve corresponds to a temperature exceeding 85° C., a formed film may have poor low-temperature heat sealability, thereby becoming unusable.

If the ratio H/W is less than 1, the copolymer may contain a not negligible amount of components that cause blocking, and a formed film may have impaired heat sealability after the passage of a long time, thereby becoming unusable.

Obtaining Elution Curve by Temperature Rising Elution Fractionation

The elution volume of the copolymer is measured by temperature rising elution fractionation (TREF) performed in the following manner on the basis of the principles described in, for example, "Journal of Applied Polymer Science" (Vol. 26, pages 4217 to 4231, 1981) or "Drafts for Symposium on Polymers" (2P1CO9, 1985).

In principle, TREF of a polymer is performed as follows: a polymer to be measured is completely dissolved in a solvent. Thereafter, the resultant solution is cooled, so that a thin polymer layer is formed on the surface of an inactive carrier. In the polymer layer, those components of the polymer which crystallize easily are on the inner side (the side of the layer close to the surface of the inactive carrier) while components which do not crystallize easily are on the outer side.

When temperature is raised continuously or in a stepwise manner, elution occurs, starting with the non-crystalline components of the relevant polymer, that is, those short-chain branches of the polymer having relatively high degrees of branching, these polymer components being eluted in low-temperature stages. As the temperature increases, those portions having lower branching degrees are eluted gradually. Finally, the branchless straight-chain portion is eluted, thereby completing TREF.

The concentrations of fractions eluted at each temperature are detected, and each elution volume is plotted against elution temperatures to obtain an elution curve in a graphical representation. Such an elution curve enables the component distribution of the polymer to be determined.

④ Integral Elution Amount

The ethylene-α-olefin copolymer used in the present invention should preferably have a specific integral elution volume obtained in the above-described TREF by integrating the proportions by weight of eluted fractions at a certain elution temperature, the integral elution volume being not more than 10% by weight (percentages by weight will hereinafter be abbreviated to wt %) at an elution temperature of 10° C., and not less than 90 wt % at an elution temperature of 90° C. Preferably, the integral elution volume is not more than 10 wt % at an elution temperature of 20° C., and not less than 95 wt % at an elution temperature of 90° C. More preferably, the integral elution volume is not more than 5 wt % at an elution temperature of 20° C., and not less than 97 wt % at an elution temperature of 90° C.

⑤ Q Value

The ethylene-α-olefin copolymer used in the present invention should preferably have a specific Q value (the ratio Mw/Mn of the weight-average molecular weight Mw with respect to the number-average molecular weight Mn) obtained by size exclusion chromatography (SEC), the Q value being not more than 4, preferably not more than 3, and more preferably not more than 2.5.

If the Q value of the copolymer is greater than the above-specified value, the external appearance of a produced film tends to be impaired.

(b) Preparation of Ethylene-α-olefin Copolymer

A linear low-density polyethylene of the type being described may be prepared by copolymerizing the main component, ethylene, and the sub-component, α-olefin, by using a metallocene catalyst, in particular, a metallocene-alumoxane catalyst or a catalyst such as that disclosed, e.g., in International Patent Laid-Open No. WO92/01723, comprising a mixture of a metallocene compound and a compound, such as one described below, capable of forming a stable anion by reacting with a metallocene compound. A preparation method disclosed, for example, in any of the following publications may be used: Japanese Patent Laid-Open Nos. 58-19309, 59-95292, 60-35005, 60-35006, 60-35007, 60-35008, 60-35009, 61-130314, and 3-163088; European Patent Laid-Open No. 420436; U.S. Pat. No. 5,055,438; and International Patent Laid-Open No. WO91/04257.

The above-stated compound capable of forming a stable anion by reacting with a metallocene compound is either an ionic compound having ion pairs of cations and anions, or an electrophilic compound. Such a compound forms a stable ion by reacting with a metallocene compound, thereby providing an active species for polymerization.

The above ionic compound is expressed by the following general formula (I):

In the formula (I), Q represents a cation component of the ionic compound. The cation component may be, for example, carbonium cation, tropylium cation, ammonium cation, oxonium cation, sulfonium cation or phosphonium cation. Also, the cation component may be a metallic cation or an organometallic cation, which cation itself can be easily reduced.

The cation component may be a cation which can give away proton(s), as disclosed in Japanese Patent Publication No. 1-501950, or a cation which does not give away proton(s). Specific examples of cations of the second type include triphenylcarbonium, diphenylcarbonium, cycloheptatrienium, indenium, triethylammonium, tripropylammonium, tributylammonium, N,N-dimethylanilinium, dipropylammonium, dicyclohexylammonium, tripheylphosphonium, trimethyiphosphonium, tri(dimethylphenyl)phosphonium, tri(methylphenyl)phosphonium, triphenylsulfonium, triphenyloxonium, triethyloxonium, pyrylium, silver ion, gold ion, platinum ion, palladium ion, mercury ion, and ferrocenium ion.

In the above formula (I), Y represents an anion component of the ionic compound which is transformed into a stable anion through reaction with a metallocene compound. The anion component may be, for example, organic boron compound anion, organic aluminum compound anion, organic gallium compound anion, organic phosphorus compound anion, organic arsenic compound anion or organic antimony compound anion. Specific examples of such anions include tetraphenyl boron, tetrakis(3,4,5-trifluorophenyl) boron, tetrakis(3,5-di(trifluoromethyl)phenyl) boron, tetrakis(3,5-(t-butyl)phenyl) boron, tetrakis(pentafluorophenyl) boron, tetraphenyl aluminum, tetrakis(3,4,5-trifluorophenyl) aluminum, tetrakis(3,5-di(trifluoromethyl)phenyl) aluminum, tetrakis(3,5-di(t-butyl)phenyl) aluminum, tetrakis(pentafluorophenyl) aluminum, tetraphenyl gallium, tetrakis(3,4,5-trifluorophenyl) gallium, tetrakis(3,5-di(trifluoromethyl)phenyl) gallium, tetrakis(3,5-di(t-butyl)phenyl) gallium, tetrakis(pentafluorophenyl) gallium, tetraphenyl phosphorus, tetrakis(pentafluorophenyl) phosphorus, tetraphenyl arsenic, tetrakis(pentafluorophenyl) arsenic, tetraphenyl antimony, tetrakis(pentafluorophenyl) antimony, decaborate, undecaborate, carbadodecaborate, and decachlorodecaborate.

As stated above, an electrophilic compound may be used instead of an ionic compound, the electrophilic compound comprising a certain kind of Lewis acid capable of forming a stable anion by reacting with a metallocene compound so as to provide an active species for polymerization. The electrophilic compound may be, for example, a halogenated metal compound of varying type, or a metal oxide known as a solid acid. Specifically, halogenated magnesium, inorganic oxides of the Lewis-acid type, or the like may be used.

α-Olefin

α-olefin having a carbon number of 3 to 18, which serves as the sub-component of the ethylene-α-olefin copolymer, may comprise, for example, propylene, 1-butene, 1-pentene, 1-hexene, 1-octene, 1-heptene, 4-methylpentene-1, 4-methylhexene-1 or 4,4-dimethylpentene-1. Among α-olefins having a carbon number of 3 to 18, those having a carbon number of 4 to 12 are preferable, and those having a carbon number of 6 to 10 are more preferable. It is preferable that 2 to 60 wt % of one or more such α-olefins be copolymerized with 40 to 98 wt % of ethylene.

Ethylene-α-olefin Copolymerization

Methods which may be used to copolymerize ethylene and α-olefin comprise, for example, gaseous phase methods, slurry methods, solution methods or high-pressure ion polymerization methods. Among these, solution methods and high-pressure ion polymerization methods are preferable, with preparation by a high-pressure ion polymerization method being particularly preferable.

The above-mentioned high-pressure ion polymerization method is a method for continuous production of an ethylene-based polymer, such as that disclosed, e.g., in Japanese Patent Laid-Open No. 56-18607 or 58-225106, and the method adopts reaction conditions comprising a pressure of not less than 100 kg/cm$^2$, preferably a pressure within a range of from 200 to 2000 kg/cm$^2$, and a temperature of not less than 125° C., preferably a temperature within a range from of 130° to 250° C., and more preferably from 150° to 200° C.

(2) Component B (High-pressure Low-density Polyethylene)

(a) Properties of Component B

It is important that the high-pressure low-density polyethylene (LDPE) serving as component B of a resin composition for laminates according to the present invention has the following properties ① to ④, preferably ① to ⑥:

① Melt Flow Rate

The high-pressure low-density polyethylene used in the present invention should have a melt flow rate (MFR) within a range from 0.1 to 20 g/10 min. as measured in accordance with Japanese Industrial Standards (JIS) K7210, preferably from 1 to 13 g/10 min., and more preferably from 2 to 13 g/10 min.

If the melt flow rate of the polyethylene exceeds the upper limit of the range of from 0.1 to 20 g/10 min., film formation may be unstable. If the melt flow rate is less than the lower limit of this range, extrudability as well as the external appearance of a formed film may be impaired or spoiled.

② Density

The high-pressure low-density polyethylene used in the present invention should have a density within a range of from 0.915 to 0.93 g/cm$^3$ as measured in accordance with JIS K7112, preferably from 0.916 to 0.925 g/cm$^3$, and more preferably from 0.918 to 0.922 g/cm$^3$.

If the density of the polyethylene exceeds the upper limit of the range of from 0.915 to 0.93 g/cm$^3$, low-temperature heat sealability may be impaired. If that density is smaller than the lower limit of this range, a formed film may have a surface suffering from blocking.

③ Memory Effect (ME)

The high-pressure low-density polyethylene used in the present invention should have a memory effect (3 grams) of not less than 1.6, preferably not less than 1.8, more preferably not less than 2.0, and most preferably not less than 2.3.

A memory effect lower than 1.6 is not preferable because this may make film formation unstable.

Memory effect (3 grams) is measured in the following manner by using a melt indexer such as that used in JIS K7210, and by setting measurement conditions comprising a cylinder temperature of 24° C., and a constant rate extrusion amount of 3 g/min:

The desired sample is charged into the apparatus, and only the piston is placed on the sample. After 6 minutes have passed, the prescribed extrusion rate is applied. Then, a graduated cylinder containing ethyl alcohol is placed immediately below the orifice of the die, so that a straight extrudate can be collected.

The diameter D of the collected extrudate is measured with a micrometer, and the memory effect ME of the sample is calculated by the following formula where the diameter of the orifice is represented as $D_0$:

$$ME = D/D_0$$

(4) Melt Tension (MT; Melt Tension at Fracture)

The high-pressure low-density polyethylene used in the present invention should have a melt tension of not less than 1.5 g, preferably not less than 2.5 g, and more preferably not less than 5 g. Too small a melt tension is not preferable because it reduces the extent to which workability is improved.

(5) Interrelationship between ME and MT

The high-pressure low-density polyethylene should preferably have the following interrelationship between ME (3 grams) and MT:

$$ME \geq [0.05 \times MT + 1.3]/g$$

More preferably, the polyethylene should have an ME (3 grams)-MT interrelationship expressed as follows:

$$ME \geq [0.05 \times MT + 1.5]/g$$

If the preferable interrelationship is not satisfied, workability is only improved to a reduced extent.

(6) Q Value

The high-pressure low-density polyethylene used in the present invention should preferably have a specific Q value (the ratio Mw/Mn of the weight-average molecular weight Mw with respect to the number-average molecular weight Mn) obtained by size exclusion chromatography (SEC), the Q value being within a range of from 5 to 30, preferably from 7 to 25, and more preferably from 10 to 20.

If the Q value of the polyethylene is greater than 30, the external appearance of a formed film tends to be impaired. Too small a Q value is not preferable either, because film formation tends to be unstable.

(b) Specific Examples of High-pressure Low-density Polyethylene Which May Be Used A high-pressure low-density polyethylene to be used may be suitably selected from among commercially available products. It is preferable to use a polyethylene product manufactured by an autoclave method at a reaction temperature of not less than 220° C. under a reaction pressure of not more than 1700 kg/cm².

[II] Proportion of Components

An ethylene-α-olefin copolymer, serving as component A, and a high-pressure low-density polyethylene, serving as component B, should be contained in a resin composition for laminates according to the present invention in an amount of 50 to 99% and an amount of 1 to 50%, respectively, both with respect to the total weight of the resin composition. Preferably, component A is contained in an amount of 55 to 95 wt % while component B is contained in an amount of 5 to 45 wt %, and, more preferably, these components A and B are contained in an amount of 60 to 85 wt % and an amount of 15 to 40 wt %, respectively.

If component B is contained in too small an amount, workability is improved only to an insufficient extent. If component A is contained in too small an amount, heat sealability and hot tack are impaired.

[III] Production of Resin Composition for Laminates (1) Mixing

A resin composition according to the present invention is produced by suitably mixing together an ethylene-α-olefin copolymer, serving as component A, and a high-pressure low-density polyethylene, serving as component B. For this purpose, a method similar to a conventional method for the production of a resin composition may be used.

Specifically, component A and component B are melted and kneaded together by using an extruder, a Brabender Plastograph, a Banbury mixer, a kneader-blender or the like, to thereby obtain a resin composition for laminates according to the present invention.

The thus obtained resin composition is normally in the shape of a pellet formed by a commonly used method, such as a method using an extruder.

(2) Other Additives

A resin composition for laminates according to the present invention may contain auxiliary additives generally used in a resin composition, such as antioxidants, heat stabilizers, light stabilizers, ultraviolet absorbers, neutralizers, anti-fogging agents, anti-blocking agents, slip agents, and/or colorants.

(3) Properties of Resin Composition

A resin composition for laminates according to the present invention obtained as described above should preferably have the following properties: a melt flow rate within a range of from 5 to 25 g/10 min., preferably from 8 to 20 g/10 min.; a density within a range of from 0.87 to 0.932 g/cm³, preferably from 0.89 to 0.912 g/cm³; a Q value within a range of from 2 to 10, preferably from 3 to 6; a memory effect (ME 3 grams) within a range of from 1.2 to 2.3, preferably from 1.5 to 2.0; and a melt tension (MT) of not less than 1.0 g, preferably, not less than 1.5 g. The memory effect ME and the melt tension MT of the resin composition preferably satisfy the following interrelationship:

$$ME \geq [0.2 \times MT + 1]/g.$$

[IV] Forming

A pellet obtained as described above may be suitably formed to obtain a film.

Such a film may be produced by performing dry laminating, extrusion laminating, sandwich laminating, co-extruding or the like, so as to extrusion-coat the resin composition on a base of varying type or to co-extrude the resin composition together with such a base, thereby obtaining a laminated film for wrapping, packaging, etc. It is particularly preferable that the resin composition be laminated on a base by an extrusion laminating method, to thereby obtain a laminate.

The resin composition may also be used as a sandwich laminate material in the production of a sandwich laminate having a base and a sealant.

The base may be made of various types of materials such as the following: paper; aluminum foil; cellophane; woven cloth; non-woven cloth; and polymers which can be formed into a film, such as olefin polymers (e.g., high-density polyethylene, medium- or low-density polyethylene, ethylene-vinyl acetate copolymer, ethylene-acrylate copolymer, ionomer, polypropylene, poly-1-butene or poly-4-methylpentene-1), vinyl copolymers (e.g., polyvinyl chloride, polyvinylidene chloride, polystyrene, polyacrylate or polyacrylonitrile), polyamides (e.g., nylon 6, nylon 66, nylon 7, nylon 10, nylon 11, nylon 12, nylon 610 or polymetaxylylene adipamide), polyesters (e.g., polyethylene terephthalate, polyethylene terephthalate/isophthalate or polybutylene terephthalate), polyvinyl alcohols, ethylene-vinyl alcohol copolymers, or polycarbonates.

The present invention will be described more specifically by examples thereof.

[I] Methods for Property Measurement and Evaluation

Before entering into the description of the examples of the present invention and comparative examples, which will be given in section [II], certain methods used to measure various properties of these examples and to evaluate these examples will be outlined.

(1) Methods for Property Measurement (a) Melt Flow Rate: JIS K7210 (at a temperature of 190C under a load of 2.16 kg)

(b) Density: JIS K7112

(c) Memory Effect (ME): A melt indexer of the type described in JIS K7210 is used under measurement conditions comprising a cylinder temperature of 240° C. and a constant rate extrusion amount of 3 g/min.

Each sample is charged into the apparatus, and only the piston is placed on the sample. After the passage of 6 minutes, the prescribed extrusion rate is applied. Then, a graduated cylinder containing ethyl alcohol is placed immediately below the orifice of the die, and a straight extrudate is collected. The diameter D of the collected extrudate is measured with a micrometer, and the memory effect ME of the sample is calculated by the following formula:

$$ME = D/D_0 \quad (D_0: \text{the diameter of the orifice})$$

(d) Elution Curve: In the present invention, the peak of an elution curve obtained by temperature rising elution fractionation (TREF) is checked. TREF is performed in principle as follows: The relevant polymer is completely dissolved in a solvent at a high temperature. Thereafter, the resulting solution is cooled, so that a thin polymer layer is formed on the surface of an inactive carrier. Then, temperature is raised continuously or in a stepwise manner, and eluted fractions of the polymer are collected. The concentrations of fractions eluted at each temperature are successively detected, and each elution volume is plotted against elution temperatures to obtain an elution curve in a graphical representation. The component distribution of the polymer can be determined on the basis of the elution curve. In the present invention, the peak of such an elution curve is checked.

An elution curve of a sample is obtained in the following manner:

The apparatus used for measurement is a cross fractionating apparatus ("CFC T150A" (trade name); produced by Mitsubishi Petrochemical Co., Ltd.), and measurement is performed in accordance with the method described in an operation manual attached to the apparatus.

The cloth fractionating apparatus includes two on-line connected sections, that is, a temperature rising elution fractionation (TREF) mechanism for fractionating a sample by utilizing differences in dissolution temperature between various portions thereof, and a size exclusion chromatography (SEC) section for separating each fractionated portion by the size of molecules.

First, a sample (a copolymer) to be measured is dissolved in a solvent of o-dichlorobenzene at a temperature of 140° C. to prepare a sample solution having a sample concentration of 4 mg/ml. The sample solution is charged into the sample loop of the apparatus. Thereafter, the apparatus automatically performs measurements at set conditions.

0.4 ml of the sample solution retained in the sample loop is fed to a TREF column (a stainless-steel column attached to the apparatus, the column being filled with glass beads serving as an inactive carrier, and having an inner diameter of 4 mm and a length of 150 mm). Then, the fed sample is cooled from 140° C. to 0° C. at a cooling speed of 1° C./min., thereby causing the sample to be coated on the surface of the inactive carrier. In this process, a polymer layer is formed on the surface of the inactive carrier in such a manner that components which are relatively highly crystalline (components capable of being crystallized easily) enter first into the layer, and then components which are relatively lowly crystalline (components not capable of being crystallized easily) add to the layer. After the TREF column has been held at 0° C. for 30 min., a 2-ml fraction eluted at 0° C. is fed from the TREF column to a SEC column unit comprising three SEC columns ("AD80M/S" (trade name); produced by Showa Denko K.K.) at a flow rate of 1 ml/min.

While the SEC section performs separation by molecular size, the temperature of the TREF column is raised to a subsequent elution temperature (5° C. in this case), and maintained at this temperature for approximately 30 min. Thus, the SEC column unit subsequently performs the separation of each eluted fraction at a cycle of 39 min. The elution temperature is raised stepwise from 0° C. to 5°, 10°, 15°, 20°, 25°, 30°, 35°, 40°, 45°, 49°, 52°, 55°, 58°, 61°, 64°, 67°, 70°, 73°, 76°, 79°, 82°, 85°, 88°, 91°, 94°, 97°, 100°, 102°, 120°, and 140° C. The portions of the sample solution separated by the SEC column unit by molecular size are processed by an infrared spectrophotometer attached to the apparatus. The infrared spectrophotometer measures, through detection with a wavelength of 3.42μ on the basis of stretching vibration of methylene, the absorbance of each separated portion that corresponds to the concentration of the polymer in the particular portion. Thus, chromatograms concerning individual fractions eluted at various elution temperatures ate obtained.

Thereafter, data processing softwear provided in the apparatus is used. Specifically, a base line is drawn in each of the chromatograms resulting from the above measurement, and the following calculations are performed: The individual areas of the chromatograms are integrated, and an integral elution curve is obtained. Further, the integral elution curve is differentiated with respect to temperature, thereby obtaining a differential elution curve. The graphs resulting from these calculations are output to a printer connected with the apparatus.

In the thus output graph of the differential elution curve, the abscissa represents the elution temperature with a dimension of 89.3 mm of the abscissa corresponding to a change through 100° C. and the ordinate represents the differential elution volume with a dimension of 76.5 mm of the ordinate corresponding to a change through 0.1 when the entire integral elution volume is 1.0 and each differentiated quantity consists of a change in elution volume with a change in temperature by 1° C. The height H in millimeters of the peak of the differential elution curve is divided by the width W in millimeters of the curve at half of the height H, thereby calculating the ratio H/W of the differential elution curve of the particular sample.

(e) Q Value: An apparatus for size exclusion chromatography (SEC) is used for measuring each Q value (weight-average molecular weight/number-average molecular weight) under the conditions shown below. In this measurement, a universal calibration curve is obtained by using monodisperse polystyrene, and the molecular weights are calculated as those of straight-chain polyethylene:

Apparatus type: Waters Model 150C GPC
Solvent: o-dichlorobenzene
Flow rate: 1 ml/min.
Temperature: 140° C.
Measurement concentration: 2 mg/ml
Charged amount: 200 µl
Columns: three columns ("AD80M/S" (trade name); produced by Showa Denko K.K.)

(2) Methods for Evaluation (a) Surging: Extrusion laminating is performed by using a base made of kraft paper, on which each sample (resin composition) is extrusion laminated with a thickness of 20 µm. When an extrusion laminated film has an L/2 dimension (where L represents the width of the film) varying within a range of less than 1.5 mm, the film is regarded as good with respect to surging, whereas when the film has an L/2 dimension varying within a range of not less than 1.5 mm, the film is regarded as suffering from surging.

(b) Melt Tension (MT: Melt Tension at Fracture): A Capillograph 1-B (trade name; produced by Toyo Seiki K.K.) is used. The take-off speed at which each sample in its molten resin state extruded at a test temperature of 190° C. at an extrusion speed of 1 cm/min. is taken off, is gradually increased. The stress at which the resin filament fractures is determined to be the melt tension of the sample. A die having a length of 8.00 mm, an inner diameter of 2.095 mm, and an outer diameter of 9.50 mm, is used.

(c) Resin Pressure: During extrusion laminating, the pressure of each sample (each resin) is measured with a pressure gauge mounted on the die head of the extruder.

(d) Neck-in: Extrusion laminating, similar to that for surging check, is performed by using a base made of kraft paper, and extrusion laminating each sample (resin composition) with a thickness of 20 µm. The amount of neck-in is calculated as the difference $L_0$–L (where $L_0$ represents the effective width of the die of the extruder, and L represents the width of each film coated on Kraft paper).

(e) Heat Sealing Strength: Each sample (laminate) is heat sealed with a platen heat sealer (produced by Toyo Seiki K.K.) at a sealing temperature of 110° C. at sealing pressure of 2 kg/cm² for a sealing period of 1 sec. Thereafter, heat sealing strength is measured with a tensile tester.

(f) 3 kg-load Heat Sealing Temperature: In the above measurement of heat sealing strength, the temperature at which a heat sealing strength of 3 kg is obtained is determined as the 3 kg-load heat sealing temperature of each sample (laminate).

(g) Hot Tack: Each sample (laminate) is subjected to a series of heat sealing operations performed under the following conditions: a sealing bar dimension of 200 mm×30 mm; a sealing pressure of 1 kg/cm²; a sealing period of 0.5 sec; a load of 50 g; a chuck pressure of 1 kg/cm²; and a sealing temperature increased from 90° to 150° C. stepwise by 5° C. for each heat sealing operation. After each heat sealing operation, the sample is maintained in a loaded state by a load of 50 g until peeling in the heat sealed portion of the sample is completed, and the distance over which peeling has occurred is measured to an accuracy of 1 mm. Finally, the hot tack of the sample is determined in terms of the temperature range that provides a peel distance of 1 to 2 mm.

(h) Take-off Speed at Fracture: A Capillograph 1-B (trade name; produced by Toyo Seiki K.K.) is used. The take-off speed at which each sample in its molten resin state extruded at a test temperature of 190° C. at an extrusion speed of 1 cm/min is taken off, is gradually increased. The maximum speed (m/min.) at which the resin filament fractures is determined to be the take-off speed at fracture of the sample. A die having a length of 8.00 mm, an inner diameter of 2.095 mm, and an outer diameter of 9.50 mm is used.

[II] Examples

EXAMPLE 1

Preparation of Ethylene-α-olefin Copolymer (Component A)

A catalyst was prepared using the method described in Japanese Patent Laid-Open No. 61-130314. Specifically, 2.0 millimols of complex ethylene-bis(4, 5, 6, 7-tetrahydroindenl)zirconium dichloride was mixed with methyl alumoxane (produced by Toyo Stauffer K.K.) in an amount of 1000 times the molar amount of the complex, and the resultant mixture was diluted in toluene to prepare 10 liters of a catalyst solution. Then, polymerization was performed in the following manner by using the catalyst.

A mixture of ethylene and 1-hexene was supplied into an agitation autoclave type continuous reactor having an inner volume of 1.5 liters in such a manner that the proportion of 1-hexene was 80% of the total weight of the mixture. The pressure within the reactor was maintained at 1600 kg/cm², and reaction was performed at 160° C.

After the reaction had completed, an ethylene-α-olefin copolymer (containing 1-hexene in an amount of 22% of the total weight of the copolymer) which was to serve as component A, was obtained. The copolymer had a melt flow rate (MFR) of 18 g/10 min., a density of 0.898 g/cm³, a Q value of 1.9, and a TREF elution curve having a single peak corresponding to a temperature of 50° C. and also having a H/W ratio of 1.5 at that temperature.

Preparation of High-pressure Low-density Polyethylene (Component B)

A high-pressure low-density polyethylene to serve as component B was obtained by an autoclave method at a reaction temperature of 260° C. at a reaction pressure of 1500 kg/cm². As a result, a high-pressure low-density polyethylene having an MFR of 4 kg/10 min., a density of 0.92 g/cm³, a memory effect (ME) of 2.4, and a Q value of 10, was obtained.

Production of Resin Composition

As shown in Table 1, the above linear low-density polyethylene (component A) and the high-pressure low-density polyethylene (component B) were blended together at a proportion of component A:component B=75:25 in wt %, and the resulting mixture was granulated with a uniaxial extruder (diameter: 40 mm) at a forming temperature of 160° C., thereby obtaining a resin composition in the form of a pellet, which composition contained component A and component B in the above-specified proportion.

Evaluation

The pellet-shaped resin composition was extruded with a uniaxial extruder (diameter: 40 mm) at a forming temperature of 280° C. to obtain a film having a thickness of 30 µm. The film was coated by extrusion laminating the film from a T die having a width of 360 mm onto a previously prepared laminate body having laminated layers comprising a normal LDPE film having a thickness of 30 µm and a biaxially oriented nylon film having a thickness of 15 µm in such a manner as form a coating on the LDPE film.

The thus formed laminated three-layer film was checked with respect to its heat sealing strength, 3-kg load heat sealing temperature, and hot tack.

Another laminate film was formed by coating a film of the resin composition by similarly extrusion laminating the film with a thickness of 20 μm on a base of kraft paper which was used instead of a biaxially oriented nylon film. The neck-in amount of the laminate film was measured, and the surging thereof was checked.

The results of this evaluation are shown in Table 1.

EXAMPLES 2 TO 16 AND COMPARATIVE EXAMPLES 1 TO 10

Resin compositions serving as other examples of the present invention and other comparative examples were each produced in the same manner as that in Example 1 except that, in each of the above example, component A and component B having properties shown in Table 1 were used. The resin compositions were used to formed laminate films similarly, which laminate films were evaluated similarly.

The results of this evaluation are also shown in Table 1.

TABLE 1

| | Example No. | | | | |
|---|---|---|---|---|---|
| | 1 | 2 | 3 | 4 | 5 |
| Component A | | | | | |
| MFR (g/10 min.) | 18 | 9 | 5 | 30 | 18 |
| Density (g/cm³) | 0.898 | 0.898 | 0.901 | 0.898 | 0.880 |
| TREF | | | | | |
| Number of peaks | 1 | 1 | 1 | 1 | 1 |
| Peak temperature (τ) | 50 | 53 | 55 | 50 | 27 |
| H/W | 1.5 | 3.2 | 4 | 1.5 | 1.2 |
| Integral elution volume | | | | | |
| 10τ (%) | 2.1 | 0.5 | 0.1 | 3.7 | 5 |
| 20τ (%) | 3.0 | 1.7 | 0.5 | 4.6 | 7 |
| 80τ (%) | 100 | 100 | 100 | 98.5 | 100 |
| 90τ (%) | 100 | 100 | 100 | 100 | 100 |
| Q value | 1.9 | 2.0 | 1.9 | 2.0 | 2.1 |
| Component B | | | | | |
| MFR (g/10 min.) | 4 | 4 | 4 | 4 | 4 |
| Density (g/cm³) | 0.92 | 0.92 | 0.92 | 0.92 | 0.92 |
| ME | 2.4 | 2.4 | 2.4 | 2.4 | 2.4 |
| MT (g) | 10.2 | 10.2 | 10.2 | 10.2 | 10.2 |
| Q value | 10 | 10 | 10 | 10 | 10 |
| Ratio | | | | | |
| Comp. A:Comp. B | 75:25 | 75:25 | 75:25 | 75:25 | 75:25 |
| Composition | | | | | |
| MRF (g/10 min.) | 13 | 7 | 3.5 | 19 | 13 |
| Density (g/cm³) | 0.904 | 0.905 | 0.908 | 0.905 | 0.887 |
| ME | 1.7 | 1.7 | 1.8 | 1.6 | 1.6 |
| MT (g) | 1.6 | 2.9 | 1.8 | 2.0 | 1.7 |
| Q value | 4.8 | 4.4 | 4.8 | 4.5 | 4.6 |
| Properties of laminate | | | | | |
| Surging | ○ | ○ | ○ | ○ | ○ |
| Resin pressure (kg/cm²) | 31 | 49 | 55 | 8 | 30 |
| Neck-in (mm) | 28 | 24 | 20 | 33 | 27 |
| Heat seal strength (kg/15 mm) | 5.1 | 5.8 | 6.4 | 5.2 | 5.4 |
| Heat seal temperature at 3 kg load (τ) | 95 | 96 | 97 | 96 | 84 |
| Hot-tack (τ) | 35 | 35 | 35 | 35 | 45 |
| Take-off speed at break(m/min.) | 72 | 68 | 50 | 105 | 72 |

| | Example No. | | | | |
|---|---|---|---|---|---|
| | 6 | 7 | 8 | 9 | 10 |
| Component A | | | | | |
| MFR (g/10 min.) | 18 | 18 | 18 | 18 | 18 |
| Density (g/cm³) | 0.930 | 0.898 | 0.898 | 0.898 | 0.898 |

TABLE 1-continued

| TREF | | | | | |
|---|---|---|---|---|---|
| Number of peaks | 1 | 1 | 1 | 1 | 1 |
| Peak temperature (τ) | 98 | 50 | 50 | 50 | 50 |
| H/W | 41 | 1.5 | 1.5 | 1.5 | 1.5 |
| Integral elution volume | | | | | |
| 10τ (%) | 0 | 2.1 | 2.1 | 2.1 | 2.1 |
| 20τ (%) | 0 | 3.0 | 3.0 | 3.0 | 3.0 |
| 80τ (%) | 2.1 | 100 | 100 | 100 | 100 |
| 90τ (%) | 9.2 | 100 | 100 | 100 | 100 |
| Q value | 2.0 | 3.0 | 1.9 | 1.9 | 1.9 |
| Component B | | | | | |
| MFR (g/10 min.) | 4 | 4 | 0.5 | 18 | 20 |
| Density (g/cm³) | 0.92 | 0.92 | 0.92 | 0.92 | 0.92 |
| ME | 2.4 | 2.4 | 2.9 | 2.1 | 1.8 |
| MT (g) | 10.2 | 10.2 | 15.5 | 4.7 | 3.8 |
| Q value | 10 | 10 | 14 | 17 | 15 |
| Ratio | | | | | |
| Comp. A:Comp. B | 75:25 | 75:25 | 75:25 | 75:25 | 75:25 |
| Composition | | | | | |
| MRF (g/10 min.) | 13 | 13 | 10 | 17 | 18 |
| Density (g/cm³) | 0.928 | 0.904 | 0.904 | 0.905 | 0.905 |
| ME | 1.7 | 1.8 | 2.1 | 1.6 | 1.6 |
| MT (g) | 1.5 | 1.7 | 2.1 | 1.2 | 1.1 |
| Q value | 4.5 | 5.2 | 4.8 | 4.7 | 4.8 |
| Properties of laminate | | | | | |
| Surging | ○ | ○ | ○ | ○ | ○ |
| Resin pressure (kg/cm²) | 30 | 31 | 30 | 30 | 30 |
| Neck-in (mm) | 28 | 22 | 20 | 36 | 45 |
| Heat seal strength (kg/15 mm) | 2.9 | 5.0 | 5.2 | 5.2 | 5.1 |
| Heat seal temperature at 3 kg load (τ) | 114 | 95 | 97 | 95 | 95 |
| Hot-tack (τ) | 25 | 35 | 35 | 35 | 35 |
| Take-off speed at break(m/min.) | 70 | 70 | 56 | 94 | 100 |

| | Example No. | | | | | |
|---|---|---|---|---|---|---|
| | 11 | 12 | 13 | 14 | 15 | 16 |
| Component A | | | | | | |
| MFR (g/10 min.) | 18 | 18 | 18 | 18 | 18 | 18 |
| Density (g/cm³) | 0.898 | 0.898 | 0.898 | 0.898 | 0.898 | 0.898 |
| TREF | | | | | | |
| Number of peaks | 1 | 1 | 1 | 1 | 1 | 1 |
| Peak temperature (τ) | 50 | 50 | 50 | 50 | 50 | 50 |
| H/W | 1.5 | 1.5 | 1.5 | 1.5 | 1.5 | 1.5 |
| Integral elution volume | | | | | | |
| 10τ (%) | 2.1 | 2.1 | 2.1 | 2.1 | 2.1 | 2.1 |
| 20τ (%) | 3.0 | 3.0 | 3.0 | 3.0 | 3.0 | 3.0 |
| 80τ (%) | 100 | 100 | 100 | 100 | 100 | 100 |
| 90τ (%) | 100 | 100 | 100 | 100 | 100 | 100 |
| Q value | 1.9 | 1.9 | 1.9 | 1.9 | 1.9 | |
| Component B | | | | | | |
| MFR (g/10 min.) | 4 | 4 | 4 | 4 | 4 | 13 |
| Density (g/cm³) | 0.92 | 0.92 | 0.92 | 0.92 | 0.92 | 0.92 |
| ME | 2.4 | 2.4 | 2.4 | 2.1 | 1.8 | 2.4 |
| MT (g) | 10.2 | 10.2 | 10.2 | 6.8 | 5.5 | 8.8 |
| Q value | 10 | 10 | 10 | 6.3 | 6.0 | 12 |
| Ratio | | | | | | |
| Comp. A:Comp. B | 95:5 | 85:15 | 55:45 | 75:25 | 75:25 | 75:25 |
| Composition | | | | | | |
| MRF (g/10 min.) | 17 | 14 | 11 | 13 | 13 | 16 |
| Density (g/cm³) | 0.900 | 0.903 | 0.910 | 0.904 | 0.904 | 0.904 |
| ME | 1.3 | 1.7 | 2.2 | 1.6 | 1.6 | 1.7 |
| MT (g) | 0.7 | 1.2 | 5.2 | 1.5 | 1.3 | 1.6 |
| Q value | 2.9 | 4.1 | 6.5 | 3.2 | 3.0 | 4.8 |

TABLE 1-continued

Properties of laminate

| | | | | | | |
|---|---|---|---|---|---|---|
| Surging | ○ | ○ | ○ | ○ | ○ | ○ |
| Resin pressure (kg/cm$^2$) | 30 | 30 | 31 | 31 | 31 | 30 |
| Neck-in (mm) | 65 | 43 | 18 | 35 | 45 | 28 |
| Heat seal strength (kg/15 mm) | 5.4 | 4.9 | 5.0 | 5.0 | 5.0 | 5.0 |
| Heat seal temperature at 3 kg load (τ) | 88 | 100 | 100 | 95 | 95 | 95 |
| Hot-tack (τ) | 45 | 40 | 25 | 35 | 35 | 35 |
| Take-off speed at break (m/min.) | 200< | 170 | 59 | 72 | 80 | 72 |

| | Comparative Example No. | | | | |
|---|---|---|---|---|---|
| | 1 | 2 | 3 | 4 | 5 |
| Component A | | | | | |
| MFR (g/10 min.) | 1 | 50 | 18 | 18 | 18 |
| Density (g/cm$^3$) | 0.898 | 0.900 | 0.945 | 0.898 | 0.898 |
| TREF | | | | | |
| Number of peaks | 1 | 1 | 1 | 1 | 1 |
| Peak temperature (τ) | 56 | 49 | 97 | 50 | 50 |
| H/W | 5.5 | 1.4 | 45 | 1.5 | 1.5 |
| Integral elution volume | | | | | |
| 10τ (%) | 0.1 | 3.7 | 0 | 2.1 | 2.1 |
| 20τ (%) | 0.2 | 5.2 | 0 | 3.0 | 3.0 |
| 80τ (%) | 100 | 87.5 | 0.8 | 100 | 100 |
| 90τ (%) | 100 | 100 | 8.9 | 100 | 100 |
| Q value | 2.0 | 1.9 | 1.9 | 1.9 | 1.9 |
| Component B | | | | | |
| MFR (g/10 min.) | 4 | 4 | 4 | 4 | 4 |
| Density (g/cm$^3$) | 0.92 | 0.92 | 0.92 | 0.92 | 0.92 |
| ME | 2.4 | 2.4 | 2.4 | 2.4 | 2.4 |
| MT (g) | 10.2 | 10.2 | 10.2 | 10.2 | 10.2 |
| Q value | 10 | 10 | 10 | 10 | 10 |
| Ratio | | | | | |
| Comp. A:Comp. B | 75:25 | 75:25 | 75:25 | 99.5:05 | 40:60 |
| Composition | | | | | |
| MRF (g/10 min.) | 1.6 | 38 | 13 | 17 | 9 |
| Density (g/cm$^3$) | 0.905 | 0.907 | 0.940 | 0.899 | 0.910 |
| ME | 1.7 | 1.0 | 1.6 | 1.2 | 2.0 |
| MT (g) | 2.0 | 0.2 | 1.6 | 0.3 | 8.9 |
| Q value | 4.5 | 4.4 | 4.4 | 2.3 | 8.7 |
| Properties of laminate | | | | | |
| Surging | x | Δ | Δ | Δ | ○ |
| Resin pressure (kg/cm$^2$) | — | — | 32 | 31 | 22 |
| Neck-in (mm) | — | — | — | — | 23 |
| Heat seal strength (kg/15 mm) | — | — | — | — | 2.2 |
| Heat seal temperature at 3 kg load (τ) | — | — | — | — | 114 |
| Hot-tack (τ) | — | — | — | — | 0 |
| Take-off speed at break(m/min.) | 9 | 200< | 70 | 200< | 30 |

| | Comparative Example No. | | | | |
|---|---|---|---|---|---|
| | 6 | 7 | 8 | 9 | 10 |
| Component A | | | | | |
| MFR (g/10 min.) | 13 | 18 | 18 | 18 | 10 |
| Density (g/cm$^3$) | 0.900 | 0.898 | 0.898 | 0.898 | 0.932 |
| TREF | | | | | |
| Number of peaks | 1 | 1 | 1 | 1 | 1 |
| Peak temperature (τ) | 63, 93 | 56 | 50 | 50 | 108 |
| H/W | 0.5, — | 1.5 | 1.5 | 1.5 | 49 |
| Integral elution volume | | | | | |
| 10τ (%) | 6.7 | 2.1 | 2.1 | 2.1 | 0 |
| 20τ (%) | 10.0 | 3.0 | 3.0 | 3.0 | 0 |
| 80τ (%) | 86.0 | 100 | 100 | 100 | 0.5 |
| 90τ (%) | 92.0 | 100 | 100 | 100 | 0.8 |
| Q value | 3.0 | 1.9 | 1.9 | 1.9 | 2.0 |
| Component B | | | | | |
| MFR (g/10 min.) | 4 | 0.05 | 4 | 4 | 4 |
| Density (g/cm$^3$) | 0.92 | 0.92 | 0.91 | 0.94 | 0.92 |
| ME | 2.4 | 2.89 | 2.2 | 2.3 | 2.4 |
| MT (g) | 10.2 | 18.1 | 7.8 | 9.8 | 10.2 |
| Q value | 10 | 9 | 5.4 | 5.1 | 10 |
| Ratio | | | | | |
| Comp. A:Comp. B | 75:25 | 75:25 | 75:25 | 75:25 | 75:25 |
| Composition | | | | | |
| MRF (g/10 min.) | 9 | 10 | 13 | 13 | 8 |
| Density (g/cm$^3$) | 0.913 | 0.905 | 0.901 | 0.910 | 0.928 |
| ME | 1.8 | 2.7 | 1.4 | 1.5 | 1.8 |
| MT (g) | 2.3 | 2.4 | 1.7 | 1.8 | 1.8 |
| Q value | 5.0 | 4.7 | 4.3 | 4.4 | 4.6 |
| Properties of laminate | | | | | |
| Surging | ○ | ○ | ○ | ○ | ○ |
| Resin pressure (kg/cm$^2$) | 34 | — | 29 | 29 | 48 |
| Neck-in (mm) | 28 | — | 28 | 27 | 29 |
| Heat seal strength (kg/15 mm) | 3.4 | — | 1.0 | 0 | 2.3 |
| Heat seal temperature at 3 kg load (τ) | 109 | — | none | 124 | 116 |
| Hot-tack (τ) | 15 | — | 0 | 0 | 20 |
| Take-off speed at break(m/min.) | 50 | 46 | 70 | 70 | 56 |

Note:
○ good formation
Δ poor formation
x no formation

EXAMPLE 17

Preparation of Ethylene-α-olefin Copolymer (Ingredient A)

A catalyst was prepared using the method described in Japanese Patent Laid-Open No. 61-130314. Specifically, 2.0 mmol of complex ethylene-bis(4, 5, 6, 7-tetrahydroindenl) zirconium dichloride was mixed with 1000 times the molar amount of the complex of methyl alumoxane (produced by Toyo Stauffer K.K.), and the resultant mixture was diluted in toluene to prepare 10 liters of a catalyst solution. Then, polymerization was performed in the following manner by using the catalyst.

A mixture of ethylene and 1-hexene was supplied into an agitation autoclave type continuous reactor having an inner volume of 1.5 liters in such a manner that the proportion of 1-hexene was 80% of the total weight of the mixture. The pressure within the reactor was maintained at 1600 kg/cm$^2$, and reaction was performed at 180° C.

After thr reaction had completed, an ethylene-α-olefin copolymer (containing 1-hexene in an amount of 22% of the total weight of the copolymer) which was to serve as component A, was obtained. The copolymer had a MFR of 18 g/10 min., a density of 0.890 g/cm$^3$, a Q value of 2.1, and a TREF elution curve having a single peak corresponding to a temperature of 50° C., and also having a H/W ratio of 1.5 at that temperature. The elution curve indicated certain elution volume besides the peak.

Preparation of High-pressure Low-density Polyethylene (Component B)

A high-pressure low-density polyethylene to serve as component B was obtained by an autoclave method at a reaction temperature of 260° C. at a reaction pressure of 1700 kg/cm$^2$. As a result, a high-pressure low-density polyethylene having an MFR of 4 kg/10 min., a density of 0.92 g/cm$^3$, a memory effect (ME) of 2.5, and a Q value of 10, was obtained.

Production of Resin Composition

As shown in Table 2, the above ethylene-α-olefin copolymer (component A) and the high-pressure low-density polyethylene (component B) were blended together at a proportion of component A:component B=75:25 in wt %, and the resulting mixture was granulated with a uniaxial extruder (diameter: 40 mm) at a forming temperature of 160° C., thereby obtaining a resin composition in the form of a pellet, which composition contained component A and component B in the above-specified proportion.

Evaluation

Two types of laminates, such as those in Example 1, were formed similarly by using the pellet-shaped resin as a laminate material, and certain properties of the laminates were evaluated in the same manner as those in Example 1. The results of this evaluation are shown in Table 2.

EXAMPLES 18 TO 27 AND COMPARATIVE EXAMPLES 11 TO 20

Resin compositions serving as further examples of the present invention and further comparative examples were each produced in the same manner as that in Example 1 except that, in each of the above examples, component A and component B having properties shown in Table 2 were used. The resin compositions were used to form laminate films similarly, which laminate films were evaluated similarly.

The results of this evaluation are also shown in Table 2.

TABLE 2

| | Example No. | | | | | | | | | | |
|---|---|---|---|---|---|---|---|---|---|---|---|
| | 17 | 18 | 19 | 20 | 21 | 22 | 23 | 24 | 25 | 26 | 27 |
| Component A | | | | | | | | | | | |
| MFR (g/10 min.) | 19 | 28 | 7 | 19 | 19 | 19 | 19 | 19 | 19 | 19 | 19 |
| Density (g/cm³) | 0.890 | 0.900 | 0.905 | 0.909 | 0.903 | 0.909 | 0.909 | 0.909 | 0.909 | 0.909 | 0.909 |
| TREF | | | | | | | | | | | |
| Number of peaks | 1 | 1 | 1 | 1 | 1 | 1 | 1 | 1 | 1 | 1 | 1 |
| Peak temperature (τ) | 51 | 55 | 62 | 60 | 78 | 60 | 60 | 60 | 60 | 60 | 60 |
| H/W | 1.4 | 1.3 | 2.1 | 5.0 | 20.2 | 5.0 | 5.0 | 5.0 | 5.0 | 5.0 | 5.0 |
| Elution outside of peak | yes | yes | yes | yes | yes | yes | yes | yes | yes | yes | yes |
| Elution temperature (τ) | 40 | 43 | 53–58 | 53–60 | 69–74 | 53–60 | 53–60 | 53–60 | 53–60 | 53–60 | 53–60 |
| Integral elution volume | | | | | | | | | | | |
| 10τ (%) | 4.6 | 2.7 | 5.0 | 2.8 | 0 | 2.8 | 2.8 | 2.8 | 2.8 | 2.8 | 2.8 |
| 20τ (%) | 5.0 | 4.2 | 5.0 | 3.5 | 0 | 3.5 | 3.5 | 3.5 | 3.5 | 3.5 | 3.5 |
| 80τ (%) | 95.0 | 95.1 | 95.3 | 95.7 | 97.1 | 95.7 | 95.7 | 95.7 | 95.7 | 95.7 | 95.7 |
| 90τ (%) | 98.9 | 100 | 99.2 | 99.3 | 99.9 | 99.3 | 99.3 | 99.3 | 99.3 | 99.3 | 99.3 |
| Q value | 2.1 | 2.2 | 2.0 | 2.0 | 2.0 | 2.0 | 2.0 | 2.0 | 2.0 | 2.0 | 2.0 |
| Component B | | | | | | | | | | | |
| MFR (g/10 min.) | 4 | 4 | 4 | 4 | 4 | 0.5 | 18 | 2 | 4 | 4 | 4 |
| Density (g/cm³) | 0.92 | 0.92 | 0.92 | 0.92 | 0.92 | 0.92 | 0.92 | 0.92 | 0.92 | 0.92 | 0.92 |
| ME | 2.5 | 2.5 | 2.5 | 2.5 | 2.5 | 2.9 | 2.1 | 1.6 | 2.5 | 2.5 | 2.5 |
| MT (g) | 12.3 | 12.3 | 12.3 | 12.3 | 12.3 | 15.5 | 8.6 | 6.6 | 12.3 | 12.3 | 12.3 |
| Q value | 12 | 12 | 12 | 12 | 12 | 14 | 10 | 7 | 12 | 12 | 12 |
| Ratio | | | | | | | | | | | |
| Comp. A:Comp. B | 75:25 | 75:25 | 75:25 | 75:25 | 75:25 | 75:25 | 75:25 | 75:25 | 95:5 | 85:15 | 55:45 |
| Composition | | | | | | | | | | | |
| MRF (g/10 min.) | 13 | 20 | 5.7 | 13 | 13 | 8 | 18 | 11 | 18 | 14 | 10 |
| Density (g/cm³) | 0.911 | 0.905 | 0.909 | 0.899 | 0.925 | 0.911 | 0.910 | 0.911 | 0.909 | 0.910 | 0.914 |
| ME | 1.7 | 1.6 | 1.8 | 1.7 | 1.8 | 1.7 | 1.6 | 1.4 | 1.3 | 1.8 | 2.1 |
| MT (g) | 1.7 | 0.9 | 3.2 | 1.8 | 1.8 | 2.4 | 1.6 | 1.1 | 0.8 | 1.5 | 5.5 |
| Q value | 5.0 | 5.2 | 4.7 | 5.2 | 5.0 | 5.0 | 5.1 | 5.0 | 2.8 | 4.1 | 6.6 |
| Properties of laminate | | | | | | | | | | | |
| Surging | ○ | ○ | ○ | ○ | ○ | ○ | ○ | ○ | ○ | ○ | |
| Resin pressure (kg/cm²) | 29 | 9 | 47 | 30 | 30 | 33 | 30 | 34 | 30 | 30 | 30 |
| Neck-in (mm) | 27 | 32 | 22 | 26 | 27 | 18 | 34 | 38 | 48 | 39 | 17 |
| Heat seal strength (kg/15 mm) | 5.9 | 5.0 | 5.3 | 5.1 | 4.6 | 5.2 | 5.2 | 5.1 | 5.3 | 5.2 | 4.9 |
| Heat seal temperature at 3 kg load (τ) | 92 | 96 | 95 | 94 | 111 | 96 | 94 | 95 | 87 | 97 | 100 |
| Hot-tack (τ) | 35 | 35 | 35 | 35 | 35 | 35 | 35 | 35 | 45 | 40 | 25 |
| Take-off speed at break (m/min.) | 76 | 118 | 38 | 76 | 74 | 50 | 200< | 150 | 200< | 165 | 59 |

| | Comparative Example No. | | | | | | | | | |
|---|---|---|---|---|---|---|---|---|---|---|
| | 11 | 12 | 13 | 14 | 15 | 16 | 17 | 18 | 19 | 20 |
| Component A | | | | | | | | *1 | | |
| MFR (g/10 min.) | 1 | 50 | 19 | 19 | 19 | 19 | 19 | 13 | 19 | 19 |
| Density (g/cm³) | 0.910 | 0.908 | 0.941 | 0.909 | 0.909 | 0.909 | 0.909 | 0.913 | 0.909 | 0.909 |

TABLE 2-continued

| TREF | | | | | | | | | | |
|---|---|---|---|---|---|---|---|---|---|---|
| Peak temperature (τ) | 61 | 58 | 98 | 60 | 60 | 60 | 60 | 63, 92 | 60 | 60 |
| H/W | 5.5 | 1.2 | 22.1 | 5.0 | 5.0 | 5.0 | 5.0 | 0.47, 2.2 | 5.0 | 5.0 |
| Integral elution volume | | | | | | | | | | |
| 10τ (%) | 0 | 6.2 | 0 | 2.8 | 2.8 | 2.8 | 2.8 | 4.1 | 2.8 | 2.8 |
| 20τ (%) | 0 | 8.7 | 0 | 3.5 | 3.5 | 3.5 | 3.5 | 6.6 | 3.5 | 3.5 |
| 80τ (%) | 100 | 95.2 | 0.5 | 95.7 | 95.7 | 95.7 | 95.7 | 83.3 | 95.7 | 95.7 |
| 90τ (%) | 100 | 98.9 | 9.3 | 99.3 | 99.3 | 99.3 | 99.3 | 90.5 | 99.3 | 99.3 |
| Q value | 1.9 | 2.4 | 1.9 | 2.0 | 2.0 | 2.0 | 2.0 | 2.0 | 2.0 | 2.0 |
| Component B | | | | | | | | | | |
| MFR (g/10 min.) | 4 | 4 | 4 | 0.01 | 30 | 4 | 4 | 4 | 4 | 4 |
| Density (g/cm$^3$) | 0.92 | 0.92 | 0.92 | 0.92 | 0.92 | 0.910 | 0.935 | 0.92 | 0.92 | 0.92 |
| ME | 2.5 | 2.5 | 2.5 | 2.6 | 1.6 | 2.3 | 2.5 | 2.5 | 2.5 | 2.5 |
| MT (g) | 12.3 | 12.3 | 12.3 | 20.4 | 3.1 | 9.6 | 12.5 | 12.3 | 12.3 | 12.3 |
| Q value | 12 | 12 | 12 | 16 | 7 | 12 | 12 | 12 | 12 | 12 |
| Ratio | | | | | | | | | | |
| Comp. A:Comp. B | 75:25 | 75:25 | 75:25 | 75:25 | 75:25 | 75:25 | 75:25 | 75:25 | 99.5:0.05 | 40:60 |
| Composition | | | | | | | | | | |
| MRF (g/10 min.) | 2 | 40 | 13 | 10 | 22 | 13 | 13 | 9 | 18 | 7 |
| Density (g/cm$^3$) | 0.911 | 0.910 | 0.934 | 0.912 | 0.911 | 0.909 | 0.914 | 0.915 | 0.910 | 0.916 |
| ME | 1.8 | 1.4 | 1.7 | 1.9 | 1.3 | 1.7 | 1.7 | 1.8 | 1.4 | 2.1 |
| MT (g) | 2.2 | 0.2 | 1.7 | 2.5 | 0.2 | 1.6 | 1.9 | 1.7 | 0.4 | 9.1 |
| Q value | 4.9 | 5.5 | 4.8 | 5.0 | 4.9 | 5.0 | 5.1 | 5.8 | 3.0 | 8.0 |
| Properties of laminate | | | | | | | | | | |
| Surging | x | x | ○ | x | ○ | Δ | Δ | ○ | Δ | ○ |
| Resin pressure (kg/cm$^2$) | — | — | 30 | — | 30 | 30 | 30 | 28 | 38 | 29 |
| Neck-in (mm) | — | — | 28 | — | 90 | 30 | 33 | 27 | 95 | 20 |
| Heat seal strength (kg/15 mm) | — | — | not sealed | — | 3.8 | 2.5 | 2.8 | 4.7 | — | 2.6 |
| Heat seal temperature at 3 kg load (τ) | — | — | not sealed | — | 104 | 110 | 120 | 107 | — | 110 |
| Hot-tack (τ) | — | — | — | — | 10 | 0 | 0 | 10 | — | 0 |
| Take-off speed at break(m/min.) | 10 | 200< | 70 | 52 | 200< | 68 | 72 | 53 | 200< | 40 |

Note:
○ good formation
Δ poor formation
x no formation
*1 linear low-density polyethylene produced by using a Ziegler-type polymerization catalyst As has been described above, a resin composition for laminates according to the present invention has improved workability over that of a conventional LLDPE, and also has far more superior low-temperature heat sealability, heat sealing strength and hot tack than a conventional forming material. As a consequence, the resin composition can be very advantageously used as a laminate material for films that can be applied to a wide variety of wrapping/packaging and filling uses. For example, the laminate material may be used to form wrapping/packaging or filling films for foods such as dry foods (e.g., snacks or instant noodles), water-containing foods (e.g., miso, pickles and soups) and frozen foods, or for pharmaceutical products.

What is claimed is:

1. A resin composition for laminates, said resin composition containing 50 to 99% by weight of component A and 1 to 50% by weight of component B, said component A comprising a copolymer of ethylene and α-olefin having a carbon number of 3 to 18, said component A having the following properties (a) to (d):

(a) a melt flow rate (MFR) of 2 to 30 g/10 min.;
(b) a density of not more than 0.935 g/cm$^3$; and
(c) an integral elution volume indicated by an elution curve obtained by temperature rising elution fractionation (TREF) whereby not more than 10% by wt. of the eluted polymer is obtained when the elution temperature reaches 10° C., and not less than 90% by wt. of the eluted polymer is obtained when the elution temperature reaches 90° C.,
(d) a Q value of not more than 4, said component B comprising a free radical polymerized, high-pressure low-density polyethylene (LDPE), said component B having the following properties (a') to (e'):

(a') a melt flow rate of 0.1 to 20 g/10 min.;
(b') a density of 0.915 to 0.93 g/cm$^3$;
(c') a memory effect (ME) of not less than 1.6;
(d') a melt tension (MT) of not less than 1.5 g; and
(e') a Q value of 5 to 30.

2. A resin composition for laminates, said resin composition containing 50 to 99% by weight of component A and 1 to 50% by weight of component B, said component A comprising a copolymer of ethylene and a-olefin having a carbon number of 4 to 12, said component A having the following properties (a) to (d):

(a) a melt flow rate (MFR) of 5 to 25 g/10 min.;
(b) a density of 0.87 to 0.92 g/cm$^3$
(c) an integral elution volume indicated by an elution curve obtained by temperature rising elution fractionation (TREF) whereby not more than 10% by wt. of the eluted polymer is obtained when the elution temperature reaches 10° C., and not less than 90% by wt. of the eluted polymer is obtained when the elution temperature reaches 90° C., and (d) a Q value of not more than 4, said component B comprising a free radical polymerized, high-pressure low-density polyethylene (LDPE), said component B having the following properties (a') to (e'):

(a') a melt flow rate of 0.1 to 20 g/10 min.;

(b') a density of 0.916 to 0.925 g/cm$^3$;

(c') a memory effect (ME) of not less than 2.0;

(d') a melt tension (MT) of not less than 2.5 g. and (e') a Q value of 5 to 30.

3. A resin composition for laminates, said resin composition containing 50 to 99% by weight of component A and 1 to 50% by weight of component B, said component A comprising a copolymer of ethylene and α-olefin having a carbon number of 6 to 10, said component A having the following properties (a) to (d):

(a) a melt flow rate (MFR) of 10 to 22 g/10 min.;

(b) a density of 0.88 to 0.913 g/cm$^3$ (c) an integral elution volume indicated by an elution curve obtained by temperature rising elution fractionation (TREF) whereby not more than 10% by wt. of the eluted polymer is obtained when the elution temperature reaches 10° C., and not less than 90% by wt. of the eluted polymer is obtained when the elution temperature reaches 90° C., and (d) a Q value of not more than 4, said component B comprising a free radical polymerized, high-pressure low-density polyethylene (LDPE), said component B having the following properties (a') to (e'):

(a') a melt flow rate of 2 to 13 g/10 min.;

(b') a density of 0.919 to 0.923 g/cm$^3$;

(c') a memory effect (ME) of not less than 2.3;

(d') a melt tension (MT) of not less than 5 g. and (e') a Q value of 5 to 30.

4. A resin composition according to claim 1 wherein said component A is contained in an amount of 55 to 95% by weight, and said component B is contained in an amount of 5 to 45% by weight.

5. A resin composition according to claim 1 wherein said component A is contained in an amount of 60 to 85% by weight, and said component B is contained in an amount of 15 to 40% by weight.

6. A resin composition according to claim 1 wherein said component A has a melt flow rate of 5 to 25 g/10 min.

7. A resin composition according to claim 1 wherein said component A has a melt flow rate of 10 to 22 g/10 min.

8. A resin composition according to claim 1 wherein said component A has a melt flow rate of 13 to 20 g/10 min.

9. A resin composition according to claim 1 wherein said component A has a density of 0.915 to 0.93 g/cm$^3$.

10. A resin composition according to claim 1 wherein said component A has a density of 0.87 to 0.92 g/cm$^3$.

11. A resin composition according to claim 1 wherein said component A has a density of 0.88 to 0.913 g/cm$^3$.

12. A resin composition according to claim 1 wherein said component A has a density of 0.89 to 0.91 g/cm$^3$.

13. A resin composition according to claim 1 wherein said component B has a memory effect of not less than 1.8.

14. A resin composition according to claim 1 wherein said component B has a memory effect of not less than 2.0.

15. A resin composition according to claim 1 wherein said component B has a memory effect of not less than 2.3.

16. A resin composition according to claim 1 wherein said component B has a memory effect ME and a melt tension MT satisfying the following interrelationship:

$$ME \geq [0.05 \times MT + 1.5]/g.$$

17. A resin composition according to claim 1 having the following properties (a') to (e'):

(a') a melt flow rate of 5 to 25 g/10 min.;

(b') a density of 0.87 to 0.932 g/cm$^3$, (c') a memory effect of 1.2 to 2.3

(d') a melt tension of not less than 1.0 g; and (e') a Q value of 2 to 10.

18. A resin composition according to claim 1 having a memory effect ME and a melt tension MT satisfying the following interrelationship:

$$ME \geq [0.2 \times MT + 1]/g.$$

19. A resin composition according to claim 1 wherein said component A has an elution curve obtained by temperature rising elution fractionation (TREF), as measured from the start of elution of non-crystalline components of the relevant polymer to the completion of elution of the branchless straight chain portions of the relevant polymer, said curve having a single peak of elution volume, said single peak being the highest point of said curve as measured from start to completion and corresponding to a temperature on said curve within a range of from 20° to 85° C.

20. A resin composition according to claim 19 wherein said component A has an elution curve obtained by temperature rising elution fractionation (TREF), as measured from the start of elution of non-crystalline components of the relevant polymer to the completion of elution of the branchless straight chain portions of the relevant polymer, said curve having a single peak of elution volume, said single peak being the highest point of said curve as measured from start to completion and corresponding to a temperature on said curve within a range of from 40° to 70° C.

21. A resin composition for laminates as set forth in claim 19, wherein said single peak of elution volume of said component A corresponds to a temperature within the range of from 30° to 75° C.

22. A resin composition for laminates as set forth in claim 1 wherein said high-pressure low-density polyethylene of component B has a Q value of from 7 to 25.

23. A resin composition for laminates as set forth in claim 1 wherein said high-pressure low-density polyethylene of component B has a Q value of from 10 to 20.

* * * * *